(12) United States Patent
Verger et al.

(10) Patent No.: US 9,470,344 B2
(45) Date of Patent: Oct. 18, 2016

(54) COMPONENT FOR DRILLING AND OPERATING HYDROCARBON WELLS

(75) Inventors: Eric Verger, Gommegnies (FR); Yann Gallois, Frasnoy (FR)

(73) Assignee: VALLOUREC OIL AND GAS FRANCE, Aulnoye-Aymeries (FR)

( * ) Notice: Subject to any disclaimer, the term of this patent is extended or adjusted under 35 U.S.C. 154(b) by 768 days.

(21) Appl. No.: 13/121,963

(22) PCT Filed: Oct. 5, 2009

(86) PCT No.: PCT/EP2009/062870
§ 371 (c)(1),
(2), (4) Date: Mar. 31, 2011

(87) PCT Pub. No.: WO2010/043509
PCT Pub. Date: Apr. 22, 2010

(65) Prior Publication Data
US 2011/0174482 A1      Jul. 21, 2011

(30) Foreign Application Priority Data
Oct. 15, 2008   (FR) ..................................... 08 05693

(51) Int. Cl.
*F16L 25/00*      (2006.01)
*F16L 15/00*      (2006.01)
*E21B 17/042*     (2006.01)

(52) U.S. Cl.
CPC .............. *F16L 15/00* (2013.01); *E21B 17/042* (2013.01)

(58) Field of Classification Search
USPC ...................... 285/219, 291.1, 333, 355, 390
See application file for complete search history.

(56) References Cited

U.S. PATENT DOCUMENTS 2,239,942 A * 4/1941 Stone et al. ................... 285/110
3,100,657 A * 8/1963 Pistole et al. ................. 285/107
(Continued)

FOREIGN PATENT DOCUMENTS

JP    58 187684      11/1983
JP    59 83887       5/1984
(Continued)

OTHER PUBLICATIONS

International Search Report issued on Jan. 15, 2010 in PCT/EP2009/062870 filed Oct. 5, 2009.
Korean Examination Report issued in Application No. UAE/P/0356/2011 on Apr. 10, 2016 (English Translation).

*Primary Examiner* — Daniel P Stodola
*Assistant Examiner* — Gwendolyn Driggers
(74) *Attorney, Agent, or Firm* — Oblon, McClelland, Maier & Neustadt, L.L.P.

(57) ABSTRACT

A component used for drilling and operating hydrocarbon wells which is substantially tubular in form, and including a first end configured to be connected to a second end of another component also used for drilling and operating hydrocarbon wells. The first end includes a terminal portion including a first abutment surface configured to cooperate by interference with a corresponding abutment surface on the second end, and including a sealing surface configured to cooperate by interference with a corresponding sealing surface on the second end, the terminal portion being preceded by a threaded zone configured to be made up into a corresponding threaded zone of the second end. A compressible volume is provided in the thickness of the first terminal portion and partially beneath the sealing surface, to reduce radial stiffness of the terminal portion by at least 20%, while conserving at least 60% of axial stiffness.

17 Claims, 5 Drawing Sheets

(56) References Cited

U.S. PATENT DOCUMENTS

| | | | |
|---|---|---|---|
| 4,611,838 A * | 9/1986 | Heilmann et al. ............ 285/331 |
| 4,753,460 A | 6/1988 | Tung |
| 5,971,443 A | 10/1999 | Noel et al. |
| 6,047,997 A | 4/2000 | Olivier |
| 6,478,344 B2 | 11/2002 | Pallini, Jr. et al. |
| 6,494,499 B1 | 12/2002 | Galle, Sr. et al. |
| 6,752,436 B1 | 6/2004 | Verdillon |
| 6,755,447 B2 | 6/2004 | Galle, Jr. et al. |
| 6,869,111 B2 | 3/2005 | Goto et al. |
| 7,334,821 B2 | 2/2008 | Dutilleul et al. |
| 8,287,008 B2 | 10/2012 | Charvet-Quemin et al. |
| 2003/0067166 A1 | 4/2003 | Sivley, IV |
| 2007/0187951 A1 | 8/2007 | Roussie et al. |

FOREIGN PATENT DOCUMENTS

| | | |
|---|---|---|
| JP | 2002-173692 | 6/2002 |
| RU | 2200820 | 3/2003 |
| RU | 2297512 C2 | 4/2007 |
| WO | 2007/017082 A1 | 2/2007 |

* cited by examiner

COMPONENT FOR DRILLING AND OPERATING HYDROCARBON WELLS

The present invention relates to a component used for drilling and operating hydrocarbon wells, and more precisely the end of such a component, said end being of the male or female type and capable of being connected to a corresponding end of another component also used for drilling and operating hydrocarbon wells.

The term "component used for drilling and operating hydrocarbon wells" means any element with a substantially tubular shape intended to be connected to another element of the same type or otherwise in order to constitute in the end either a string for drilling a hydrocarbon well or a riser pipe for maintenance work such as a workover riser, or a casing string or a thick tubing string involved in operating a well. The invention is of particular application to components used in a drill string such as drill pipes, heavy weight drill pipes, drill collars and connecting parts for drill pipes and heavy weight drill pipes known as tool joints.

It is known that each component used in a drill string generally comprises an end provided with a male threaded zone and an end provided with a female threaded zone each intended to be assembled by makeup with the corresponding end of another component, the assembly defining a connection. The string so constituted is rotated during drilling at the surface of the well; for this reason, the components must be made up with a large torque in order to be capable of transmitting a rotational torque which is sufficient to allow drilling in the well without break-out or overtorquing. The makeup torque is generally reached by a tightening cooperation of the abutment surfaces provided in each of the components intended to be made up.

It is also known that mud under pressure moves inside the drill string to the bottom of the well so as to guarantee proper operation of the drill bit and so as to bring debris to the surface.

However, under certain drilling conditions or conditions of use of the connections, gas may be present under pressure. The tightness until now guaranteed by the abutment surfaces is no longer assured. Thus, it is necessary to guarantee a higher degree of sealing corresponding to high pressures at the connection between two components. To this end, it is known for other types of connections such as VAM® TOP connections described in the Applicant's catalogue number 940, to provide on the male end of the connection, beyond the threaded zone, a sealing surface which is intended to cooperate by radial interference with a sealing surface provided on the female end of the connection. More precisely, the interference cooperation between the two surfaces is made by force-fitting the sealing surface of the male end under the sealing surface of the female end during assembly of the connection by makeup. In order to facilitate force-fitting, it is known, for example, to use tapered sealing surfaces on each of the male and female ends.

However, because of the change in current specifications which tend to demand a tightness compatible with very high pressures, it is necessary to impose high contact pressures at the sealing surfaces, said contact pressures being produced by interference between the male element and the female element. The term "interference" means the difference between the value of the mean diameter of the portion carrying the sealing surface of the male end before force-fitting and the value of the mean diameter of the portion carrying the sealing surface of the male end once it is inserted in the female end.

Owing to the thicknesses of the components used in a drill string which are of the order of 12.7 to 63.5 mm (i.e. 0.5 to 2.5 inches) in accordance with the dimensional specifications required for standard API 7, which is the standard defined for drilling components by the American Petroleum Institute, the problem of galling then arises during force-fitting, said galling being a function of the value of the contact pressure and thus of the interference and thickness of the component. The same problem arises for connections for high pressure work-over risers or for thick casings or tubings.

In order to reduce the risks of galling, a number of solutions have been considered. A first route to improvement consisting of reducing the interference, has been studied. It then appeared to be incompatible with possible machining tolerances. In fact, the maximum permissible deviations and concentricity defects in the mean diameter of the portion carrying the male sealing surface while preserving the seal should be limited.

A second route to improvement consists of reducing the interference while extending the sealing surface. However, during tests it was noted that extending the contact length between the two sealing surfaces increased the instability of said contact and thus could induce a loss of tightness under certain service conditions.

For this reason, the aim of the invention is to overcome the problem of the galling of sealing surfaces by principally reducing the radial stiffness of the portion carrying the male sealing surface without losing too much of the axial stiffness.

More precisely, the invention provides a component used for drilling and operating hydrocarbon wells which is substantially tubular in shape provided with a first end which is capable of being connected to a second end of another component of a drill string, the first end comprising a terminal portion provided with a first abutment surface suitable to cooperate by interference with a corresponding abutment surface on the second end and being provided with a sealing surface which is suitable to cooperate by interference with a corresponding sealing surface of the second end, said terminal portion being preceded by a threaded zone suitable to be made up into a corresponding threaded zone of the second end, characterized in that a compressible volume is provided in the thickness of the first terminal portion and partially beneath the sealing surface, in order to reduce the radial stiffness of said terminal portion by at least 20%, while conserving at least 60% of the axial stiffness.

In accordance with certain characteristics, the compressible volume is constituted by at least one recess formed in the thickness of the terminal portion.

In accordance with other characteristics, said at least one recess encroaches over at most 50% of the first abutment surface.

In accordance with other characteristics, the recess is a groove with a substantially annular form and is axisymmetrical about the axis of revolution of the component.

In accordance with other characteristics, the recess is a groove opening at the first abutment surface.

In accordance with other characteristics, the length of the groove is selected such that it extends beneath at least 75% of the sealing surface.

In accordance with other characteristics, the groove has a thickness in the range 10% to 40% of the minimum thickness of the zone carrying the sealing surface.

In accordance with other characteristics, the compressible volume is a groove opening into the interior of the terminal portion.

In accordance with other characteristics, the length of the groove is selected such that it extends beneath at least 75% of the sealing surface.

In accordance with other characteristics, the groove has a depth in the range 10% to 40% of the minimum thickness of the zone carrying the sealing surface.

In accordance with other characteristics, the compressible volume is constituted by an annular recess opening into the interior of the terminal portion and at the abutment surface, partially filled in by a reinforcing means.

In accordance with other characteristics, the reinforcing means has an axial Young's modulus which is greater than the Young's modulus of the material comprising the drill string.

In accordance with other characteristics, the reinforcing means has a coefficient of friction at the abutment surface which is greater by at least 20% than that of the material comprising the drill string.

In accordance with other characteristics, the terminal portion comprises an appendix extending beyond the sealing surface up to the abutment surface.

In accordance with other characteristics, the first end of the component comprises a second abutment surface which is suitable to cooperate by interference with a corresponding abutment surface on the second end.

Further advantages and characteristics of the invention will become apparent from the following detailed description by way of non-limiting examples and from the accompanying drawings which not only act to provide a better understanding of the invention but also, if necessary, contribute to the definition of the invention.

Identical reference numerals are used in each of the Figures.

Figure 1A:
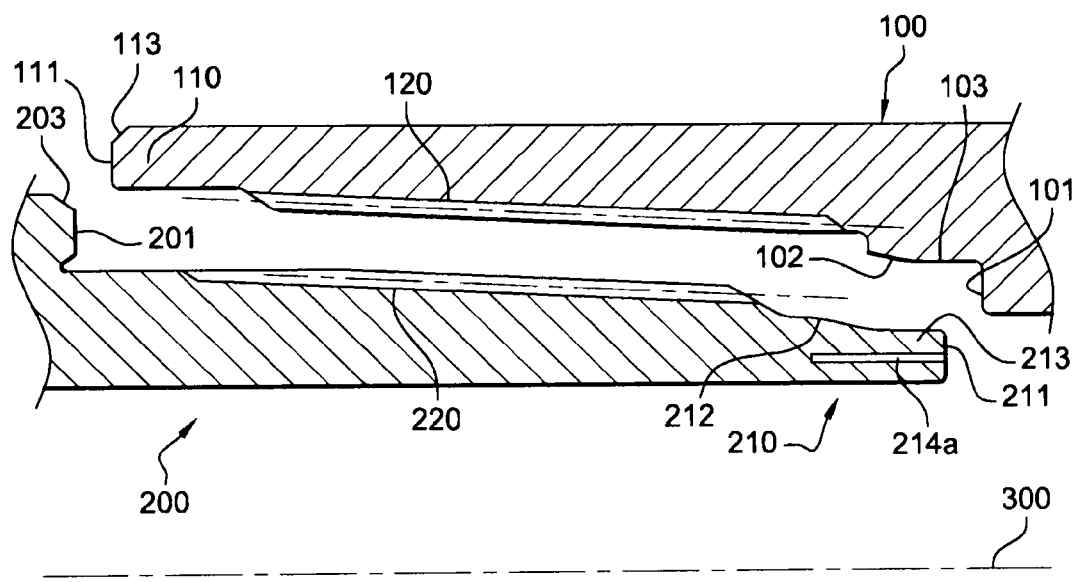
FIG. 1A shows an axial sectional view of a component of a drill string in accordance with a first embodiment.
Figure 2A:
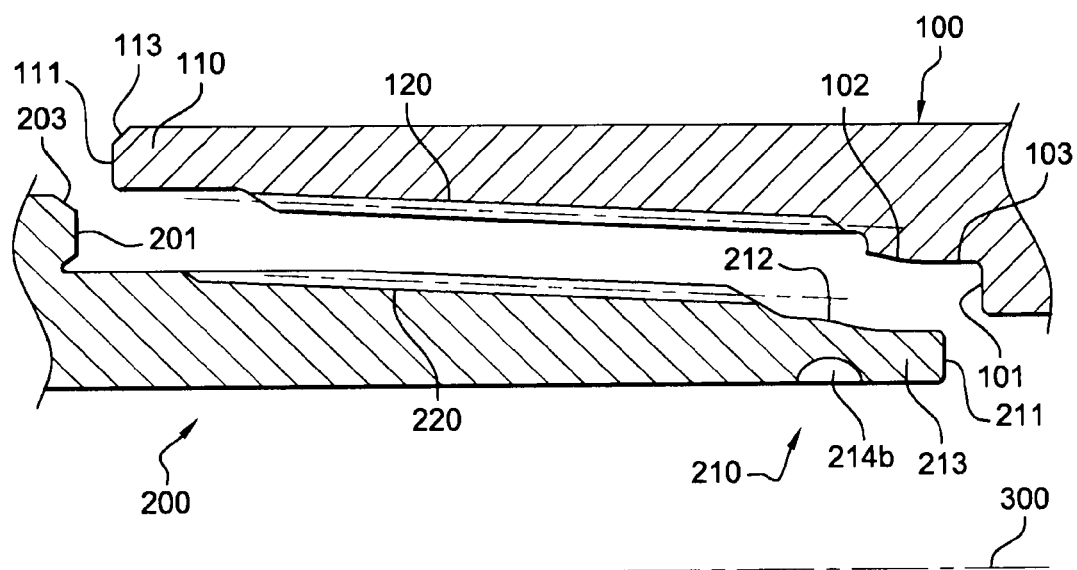
FIG. 2A shows an axial sectional view of a component of a drill string in accordance with a second embodiment.
Figure 3A:
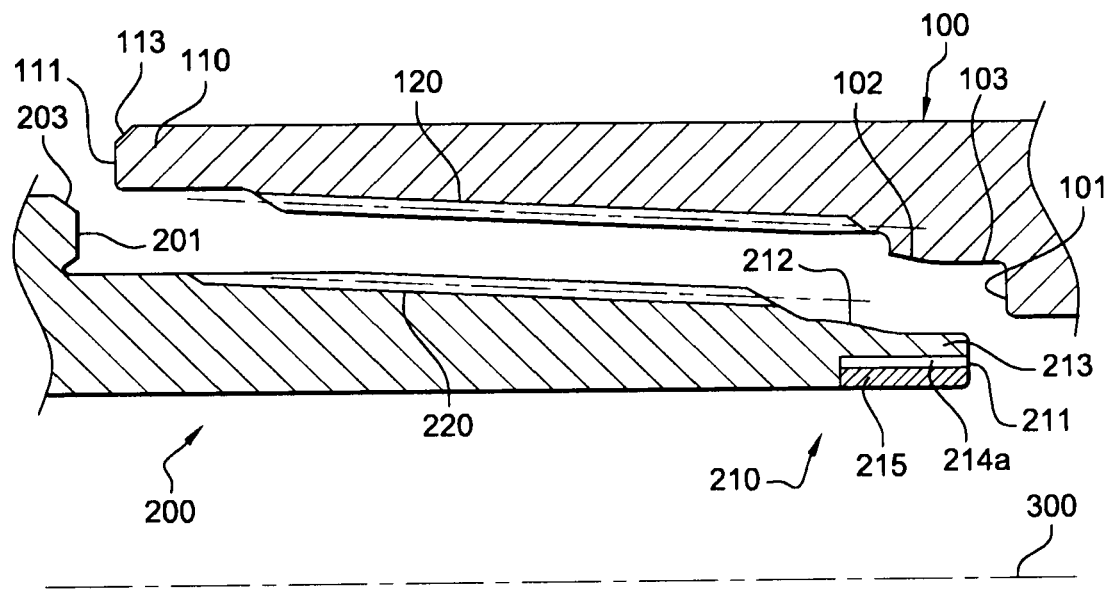
FIG. 3A shows an axial sectional view of a component of a drill string in accordance with an improvement to the first embodiment.

In accordance with the invention and as shown in FIGS. 1A, 2A, 3A, we show a connection between pipes of a drill string having a substantially tubular form. The connection is conventionally composed of a component provided with a male end known as a pin tool joint 200 and a component provided with a female end known as a box tool joint 100, the male end 200 being capable of being connected to the female end 100. The end 200 comprises a terminal portion 210 which ends in an internal abutment surface 211 which is suitable to cooperate with a corresponding abutment surface 101 of the female end 100. The terminal portion 210 also comprises a sealing surface 212 which is suitable to cooperate by interference fitting with a corresponding sealing surface 102 on the female end 100. The sealing surfaces 212, 102 are conventional sealing surfaces in the technical field under consideration. They may also be cone-on-cone sealing surfaces or toroid-on-cone or even toroid and cone-on-cone sealing surfaces, as described in applications WO-03/048623 or WO-04/109173. The end 200 also comprises a male threaded zone 220 which is suitable to be made up into a corresponding threaded zone 120 of the female end 100, which precedes said terminal portion 210. The threaded zones 220, 120 are threaded zones which are conventional in the technical field under consideration.

In accordance with the invention, a compressible volume is produced in the thickness of the terminal portion and in particular under the sealing surface, so as to reduce the radial stiffness of said terminal portion by at least 20%, while conserving at least 60% of the axial stiffness.

Advantageously, the volume 214a, respectively 214b, is a recess produced in the thickness of the terminal portion 210, such that said terminal portion 210 is more flexible when a force is applied perpendicular to the axis 300 of the male end.

The recess is also designed so that it encroaches over at most 50% of the abutment surface 211. Thus, it preserves the axial stiffness of said terminal portion such that the abutment can carry out its role during makeup of the male and female ends.

Figure 1B:
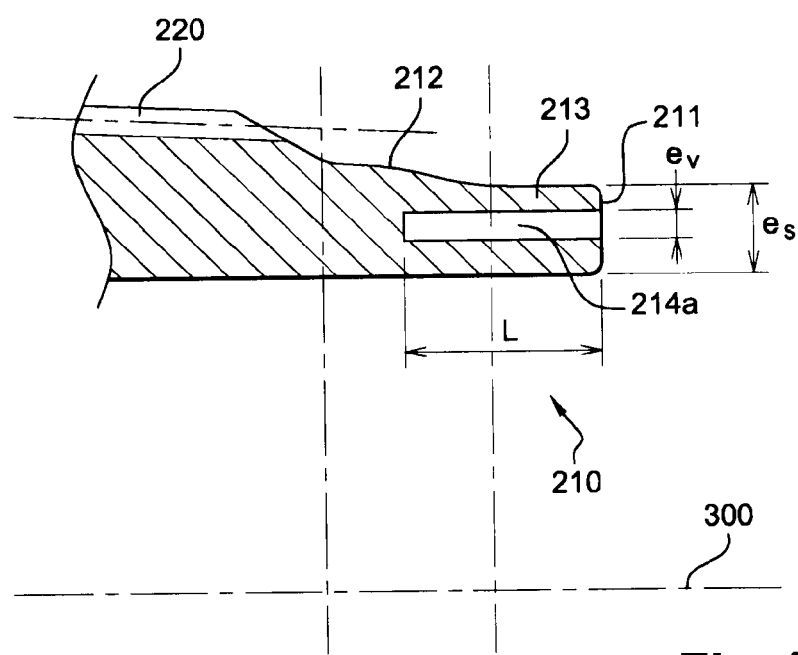
FIG. 1B shows a detailed view of the component in accordance with a first embodiment.

In accordance with a first embodiment described in detail in FIGS. 1A and 1B, the recess is a groove 214a which is substantially annular in shape and symmetrical about the axis of revolution 300 of the male end 200. The groove 214a opens at the internal abutment surface 211. The skilled person will be able to dimension the groove 214a, in particular as regards the length L, thickness $e_v$ and radial distance of the groove with respect to the sealing surface 212 so as to reduce the radial stiffness of the terminal portion 210 by at least 20%. In particular, it appears that the distance of the groove with respect to the sealing surface 212 is also a parameter which influences the radial stiffness.

Preferably, the length L of the groove 214a is selected such that it extends beneath at least 75% of the sealing surface 212. Similarly, the groove 214a has a thickness $e_v$ in the range 10% to 40% of the minimum thickness $e_s$ of the zone carrying the sealing surface 212.

By way of example, a model established by finished elements produces the equation termed the surface equation connecting the contact force F at the zone 212 as a function of the length L and the thickness $e_v$. In this example, the groove is produced at the centre of the end in order to be equidistant from the interior and exterior periphery of the end 210.

$$F = a + be_v + cL + dLe_v + ee_v^2 + fL^2 + gLe_v^2 + he_vL^2 + iL^2e_v^2$$

a, b, c, d, e, f, g, h and i being coefficients determined by finished elements and functions of the dimensional characteristics of the drill string.

Thus, for a thickness $e_s$ of the end 210 equal to 12 mm and for a groove thickness $e_v$ of 4 mm and a length L equal to 12.5 mm, a force F is obtained which is equal to 1603498 Newtons. Knowing that without a groove 214a, a force F is obtained which is equal to 2158847 Newtons, this thus results in a reduction of more than 25%.

Further, by limiting $e_v$ to 4 mm, i.e. 33% of $e_s$, the reduction in the axial stiffness is minimized since the reduction in the abutment surface 211 is minimized.

Of course, for a component with a given geometry and for a groove with fixed dimensions, it is possible to increase or reduce the radial stiffness by moving respectively closer to or away from the sealing surface 212 without varying the axial stiffness.

Figure 2B:
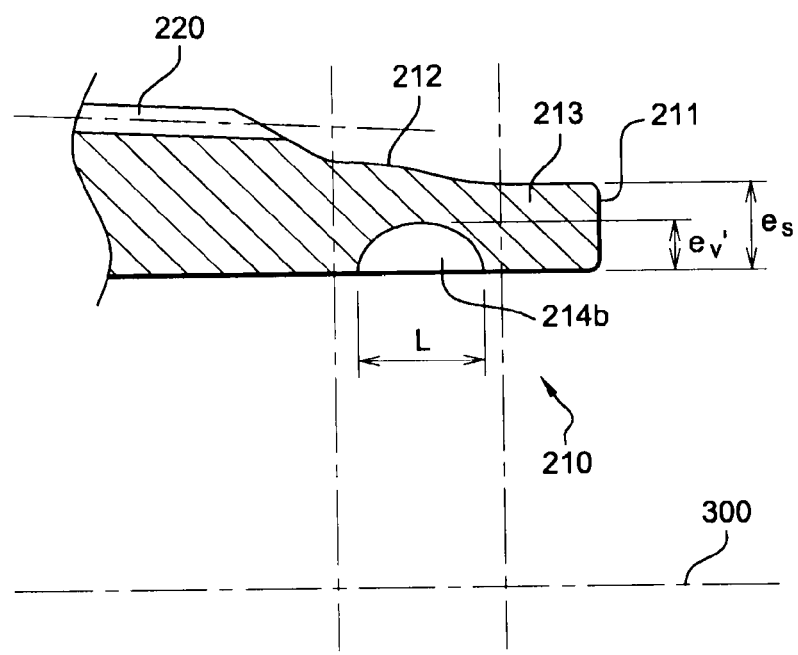
FIG. 2B shows a detailed view of the component in accordance with a second embodiment.

In a second embodiment described and detailed in FIGS. 2A and 2B, the recess is a groove 214b with a substantially annular shape and symmetrical about the axis of revolution 300 of the male end 200. The groove 214b opens into the interior of the terminal portion 210. The skilled person will be able to dimension the groove 214b, in particular in terms of length L, thickness $e_{v'}$ so as to reduce the radial stiffness of the terminal portion 210 by at least 20%.

As was the case for the first embodiment, the length L of the groove 214b is advantageously selected such that it extends beneath at least 75% of the sealing surface 212. Similarly, the grove 214b has a thickness $e_v$ in the range 10% to 40% of the minimum thickness $e_s$ of the zone carrying the sealing surface 212. A calculation also based on finished elements enables to establish an equation which is similar to that corresponding to the preceding embodiment, i.e.:

$$F = a' + b'e_{v'} + c'L + d'Le_{v'} + e'e_{v'}^2 + f'L^2 + g'Le_{v'}^2 + h'e_{v'} L^2 + i'L^2 e_{v'}^2$$

a', b', c', d', e', f', g', h' and i' being coefficients determined by finished elements and functions of the dimensional characteristics of the drill string.

Further, since the groove does not encroach over the abutment surface 211, most of the axial stiffness is retained.

Figure 3B:
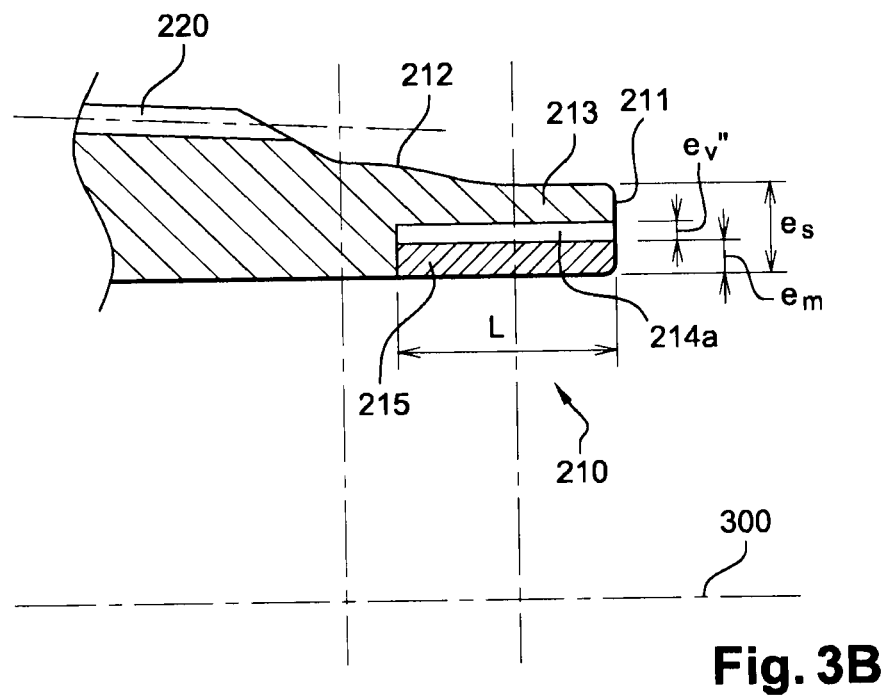
FIG. 3B shows a detailed view of the component in accordance with said improvement.

In a third embodiment described and detailed in FIGS. 3A and 3B, the annular recess 214a is filled in with a reinforcing means 215, but only partially so that a space with thickness $e_{v''}$ is provided between said reinforcing means and the interior surface of the terminal portion 210. Because of the presence of the thickness $e_{v''}$ of the space provided between said reinforcing means and the interior surface of the terminal portion 210, a reduction in the stiffness of the portion carrying the sealing surface 212 is obtained, just as in the embodiments described above. Furthermore, thanks to the reinforcing means 215 which extends to the internal abutment surface 211, the axial stiffness of the terminal portion 210 is increased, which had been affected by the recess 214.

The reinforcing means may be fixed at the end 200 using any means, for screwing, crimping, bonding, welding or brazing.

Advantageously, the reinforcing means 215 has a Young's modulus which is higher than that of the material constituting the connection. Thus, the reinforcing means 215 substantially increases the axial stiffness of the terminal portion 210 carrying the internal abutment surface. Thus, the make-up torque applied between the abutment surface 211 and the corresponding surface 101 may be increased. As an example, it is possible to use tungsten carbide or resins charged with carbon fibres.

Advantageously, the reinforcing means 215 has a coefficient of friction at the abutment surface 211 which is more by at least 20% than that of the material of which the drill string is composed, such that it acts as a brake which is suitable to counter breakout of the components of the drill string during drilling. As an example, a treatment of the abutment surface 211 may be carried out which is aimed at increasing the coefficient of friction or a cupro-nickel type metal can be deposited.

The invention has an advantageous application in the case in which the portion carrying the sealing surface 212 is extended by an appendix 213 thus extending beyond the sealing surface 212 to the internal abutment surface 211. This type of arrangement, which is used in particular to distance the sealing surfaces from the abutment surface, has the feature of reducing the axial stiffness of the end 210.

In accordance with other embodiments, the drill string component comprises an external abutment surface 201 which is suitable to cooperate by interference with a corresponding abutment surface 111 of a female end 100. Said external abutment surface enables in particular to increase the make-up torque.

Figure 4A:
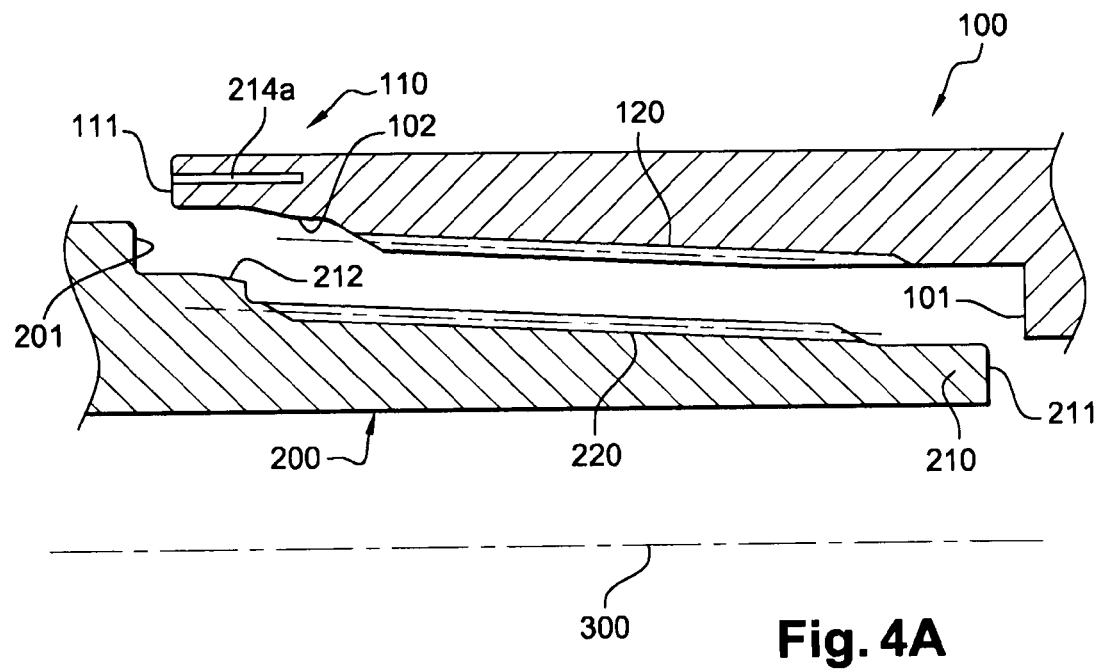
FIG. 4A shows an axial sectional view of a component of a drill string in accordance with a variation of the first embodiment.
Figure 4B:
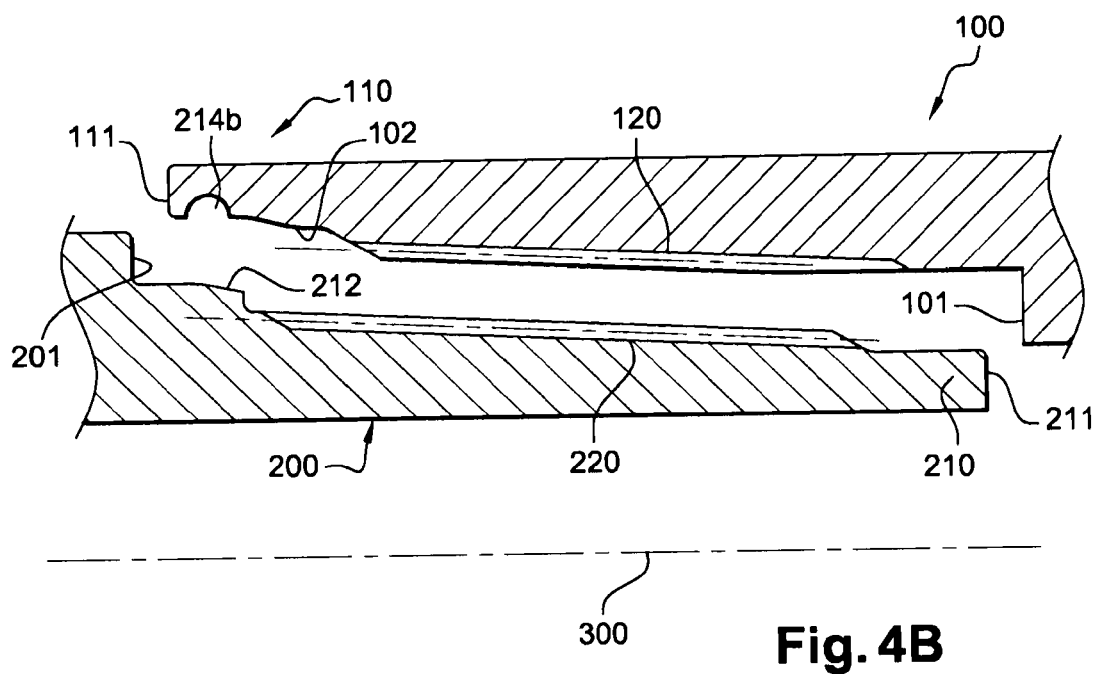
FIG. 4B shows a detailed view of the component in accordance with a variation of the second embodiment.

In the case in which a sealing surface is provided between the external abutment and the threaded zone 120, 220 and as described in FIGS. 4A and 4B, it is clearly conceivable to apply the principles of the invention described above. More precisely, it should be convenient, for example, to provide the terminal portion 110 of the female end 100 with a groove substantially annular in shape and symmetrical about the axis of revolution 300 of the female end 100. The groove might, for example, be in accordance with one of the embodiments described above.

In summary, the invention may be applied both to a component comprising an internal abutment surface 211 or an external abutment surface 201, and to a component comprising two abutment surfaces, one internal and the other external. In this latter case, it appears that the connection between the components connected in a complementary manner may have two sealing zones each being made of two sealing surfaces in cooperating interference contact. The invention can thus overcome the problem of galling caused by the sealing zones by reducing the radial rigidity, depending on the case, at the terminal portions 210, 110 while conserving the axial rigidity of the abutment surfaces 211, 111.

The components are dimensioned in the case in which there is an internal abutment and an external abutment, such that shouldering occurs initially at the internal abutment or at the external abutment.

Figure 5:
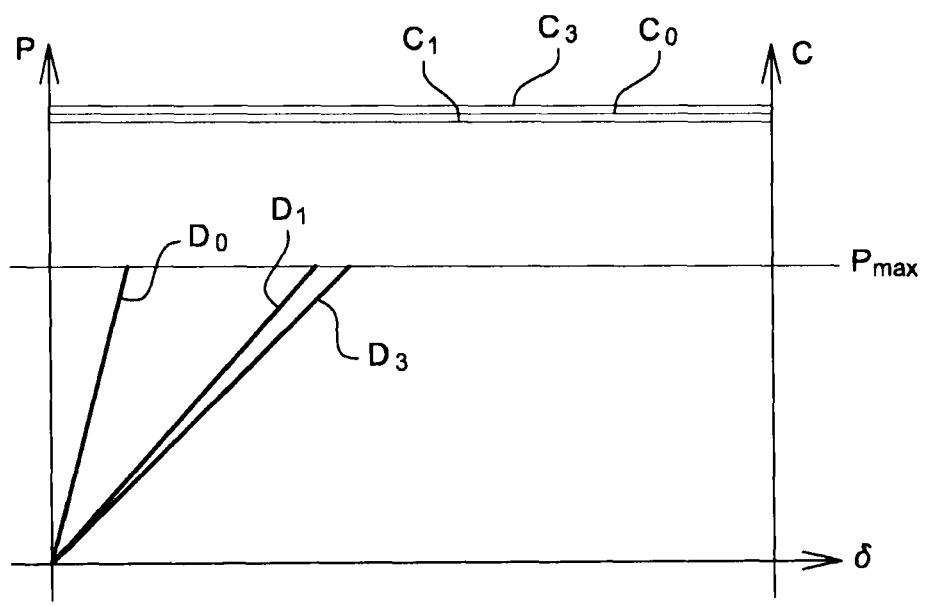
FIG. 5 shows comparative results between the prior art, the first embodiment of the invention and its improvement.

FIG. 5 shows a relative comparison of the permissible radial interferences δ, i.e. the maximum interference which it is possible to obtain while remaining below the Hertz pressure Pmax beyond which galling occurs, with D0 corresponding to a prior art connection, D1 corresponding to a connection in accordance with the first embodiment of the invention and D3 corresponding to a connection in accordance with an improvement in the first embodiment of the invention described in FIGS. 3A and 3B. It appears clearly that the embodiments D1 and D3 enable to increase the radial interference δ considerably. For this reason, the seal is optimized.

FIG. 5 also shows that the first embodiment does not greatly affect the permissible make-up torque C compared with the prior art results and that the third embodiment enables to even increase it.

In accordance with other variations of the invention, not shown in the Figures, the compressible volume provided under the sealing surface may be formed by a plurality of grooves 214a or 214b machined in the terminal portion of one end of a component used for drilling and operating hydrocarbon wells. The component may, of course, be a component of a drill string suitable to drill a hydrocarbon well, such as connecting parts for pipes and heavy-weight pipes, connecting parts known as tool joints. It may also be a component of a pipe riser for maintenance such as a workover riser, a casing component or a heavy tubing component used in well operation.

The invention claimed is:

1. A set of two components comprising a first component and a second component, the set being used in drilling and operating hydrocarbon wells that is substantially tubular in form, comprising:
   a first end of the first component connected to a second end of the second component, the first end including:
      a terminal portion having a first abutment surface to cooperate by interference with a corresponding first abutment surface on the second end, and
      a sealing surface to cooperate by interference with a corresponding sealing surface on the second end, such that a sealing surface of the set is defined by interference between the sealing surface of the first end and a corresponding sealing surface of the second end when first and second components are connected,
      the terminal portion being preceded by a threaded zone of the first end to mate with a corresponding threaded zone of the second end; and
   a reinforcing member,
   wherein a compressible volume is provided in a thickness of the terminal portion and partially beneath the sealing surface of the set, so as to reduce radial stiffness of the terminal portion by at least 20%, while conserving at least 60% of axial stiffness,
   wherein the compressible volume is bounded by an annular recess, borders of the annular recess being formed by a part of an inner wall of the first end and an outer surface of the reinforcing member, the annular recess opening between the first abutment surface and a distal end of the reinforcing member, and
   wherein the distal end of the reinforcing member and the first abutment surface of the first end contact a same continuous planar surface of the first abutment surface on the second end, such that the annular recess is free of any part of the second end when first and second components are connected.

2. The set according to claim 1, wherein the annular recess encroaches over at most 50% of the first abutment surface of the first end.

3. The set according to claim 1, wherein the annular recess is a groove with a substantially annular shape and is symmetrical about an axis of revolution of the components.

4. The set according to claim 1, wherein the annular recess has a thickness that is 10% to 40% of a minimum thickness of a zone carrying the sealing surface of the first end.

5. The set according to claim 1, wherein a length of the annular recess extends beneath at least 75% of the sealing surface of the set when first and second ends are connected.

6. The set according to claim 1, wherein the reinforcing member has an axial Young's modulus that is higher than a Young's modulus of a material of the first end.

7. The set according to claim 1, wherein the distal end of the reinforcing member has a coefficient of friction which is greater by at least 20% than a material of the first end.

8. The set according to claim 1, wherein the terminal portion includes an appendix extending beyond the sealing surface to the first abutment surface of the first end.

9. The set according to claim 1, wherein the first end includes a second abutment surface to cooperate by interference with a corresponding second abutment surface on the second end of the second component.

10. The set according to claim 1, wherein the compressible volume does not extend axially beneath the threaded zone of the first end.

11. The set according to claim 10, wherein the components are a drill pipe, a heavy weight drill pipe, or a drill collar.

12. The set according to claim 1, wherein the components are used in a drill string.

13. The set according to claim 1, wherein the components are used in a riser pipe for work-over riser maintenance work.

14. The set according to claim 1, wherein the reinforcing member is attached to the first end via screwing, crimping, bonding, welding, or brazing.

15. The set according to claim 1, wherein the reinforcing member extends to the first abutment surface of the second end when first and second ends are connected.

16. The set according to claim 1, wherein the first end includes a second abutment surface, the second abutment surface of the first end being axially offset from the first abutment surface of the first end such that the threaded zone of the first end is interposed therebetween.

17. The set according to claim 1, wherein the second end includes a second abutment surface, the second abutment surface of the second end being axially offset from the first abutment surface of the second end such that the threaded zone of the second end is interposed therebetween.

* * * * *